UNITED STATES PATENT OFFICE.

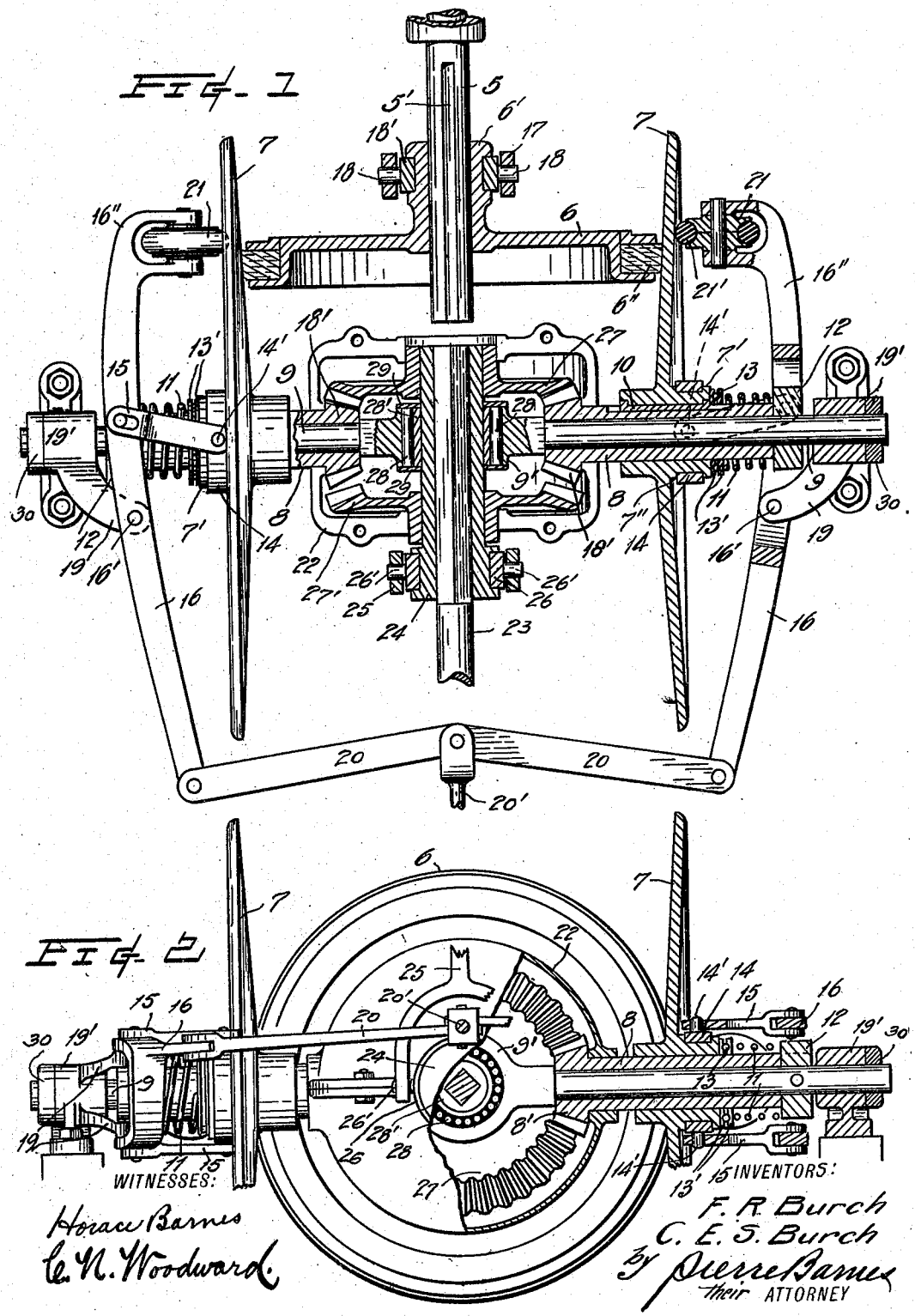

FREDERICK R. BURCH AND CHARLES E. S. BURCH, OF SEATTLE, WASHINGTON.

POWER-TRANSMITTING MECHANISM.

No. 881,846.　　　　Specification of Letters Patent.　　Patented March 10, 1908.

Application filed June 11, 1907. Serial No. 378,351.

*To all whom it may concern:*

Be it known that we, FREDERICK R. BURCH and CHARLES E. S. BURCH, citizens of the United States, residing at Seattle, in the county of King and State of Washington, have invented certain new and useful Improvements in Power-Transmitting Mechanism, of which the following is a specification, reference being had therein to the accompanying drawings.

This invention relates to power transmission mechanism, and while it is adapted to a number of applications it is particularly intended for use upon motor driven vehicles.

The object of the invention is the provision of improved mechanism whereby a uniform rotary motion of a driving shaft may be effectually transmitted to a driven shaft so as to produce various predetermined speeds to the latter and in the same or reverse directions.

With this and other ends in view the invention consists in the novel construction, adaptation and combination of parts as will be hereinafter described and claimed.

In said drawings, Figure 1 is a plan view, partly in section, of devices embodying our invention; and Fig. 2, an end elevation of the same which is also shown partly in section.

In these drawings, the reference numeral 5 designates a power or motor-shaft which has mounted thereon, as by a keyway 5' and a spline, a wheel 6 which is adapted to make frictional engagement upon its diametrically opposite sides with friction-disks 7. These disks are respectively mounted upon sleeves 8, which, in turn, are rotatably mounted upon an axle 9 arranged to have its axis in the same plane with but rectangular to the shaft 5.

The disks are keyed, as by splines 10, to the respective sleeves and are normally pressed into frictional engagement with the driving wheel 6 by springs 11 surrounding the sleeves and acting between the disk-hubs 7' and set-collars 12 upon the axle. In practice, however, anti-friction thrust bearings, such as balls 13 acting between collars 13', are desirably employed between said hubs and the springs to afford slip and prevent the rotation of the latter. The disk-hubs are grooved, as at 7'' for the reception of rings 14, which are provided with horns 14' whereby connection is had through links 15 with levers 16 which are capable of being actuated to withdraw the disks from their frictional engagement with the driving wheel while the latter is being shifted into various positions radially of the disks for the purpose of varying the speed of the driven elements. These adjustments of the driving wheel are conveniently attained by a forked lever 17 engaging the horns 18 of a ring 18' which is fitted between collets upon the wheel-hub 6'.

While the afore-described frictional elements may be constructed of various shapes, they are preferably formed to have their engaging faces somewhat conical thus rendering the opposing faces of the disks at greater distances apart at their perimeters than in proximity of their common axis and consequently necessitates the disks being forced further apart to accommodate the driving wheel, the closer the latter is operated to such axis and proportionately increasing the compression of the springs to increase their reactive power to compensate for the increased duty to which they are thereby subjected.

The levers 16 are fulcrumed by pivots 16' to suitably disposed rigid supports and, advantageously, to the bracket-arms 19 of bearing boxes 19' which are provided for the axle 9. These levers are connected by the employment of toggle-links 20 connecting an operating rod 20' with the lever-arms upon one side of their respective fulcrums.

The opposite arms 16'' carry rollers 21 adapted to be peripherally engaged with the reverse faces of the friction-disks in proximity of their peripheries and serve to sustain these disks against accidental displacement and also to overcome the tilting action due to the unbalanced frictional engagement of the disks.

Ordinarily the springs 11 will urge the rollers against the disks with sufficient force to effect the above noted function, but if not, then supplementary power may be had by actuating the levers in a contrary direction to that necessary to effect the withdrawal of the rollers from the disks and the latter from the driving wheel.

Integral with the respective sleeves 10 are toothed pinions 18' extending interiorly of a casing 22 and into which extends a shaft 23 arranged to be in alinement with the power shaft 5. The shaft 23 rotatably carries a bushing 24 which is adapted to be adjusted longitudinally thereof as by a forked lever 25 operatively connected by the horns 26' of a ring 26 positioned within an annular groove in the periphery of the bushing. Fixedly mounted upon the bushing are tooth gear wheels 27 and 27' adapted for engagement with the pinions 10', but spaced apart so that but one of them can be put into engagement with the pinions at the same time.

To afford a journal support for the bushing 24 which carries the gear-wheels, we enlarge the axle centrally of its length and bore the boss 9' thus formed to house anti-friction bearing devices such as rolls 28 and an internal tubular member 28' confined between cover plates 29 detachably connected to the ends of the boss. From this connection between the shaft 23 and the axle 11 which is journaled in boxes 19' the shaft is free to be tilted about the axis of the axle without disturbing the relation of the gear wheels with respect to their pinions, while end-play of the axle is obviated by set collars 30 acting against the boxes 19', and such collars also serve to overcome the outward pressure put upon the boxes through the manipulation of the levers 16 when operating the rollers 21 with any considerable strain against the friction disks.

The driving wheel 6 has its periphery faced with leather or other suitable material as at 6'' to provide an effective frictional contact and the rollers 21 may in like manner be provided with flexible tires 21' whereby the disks are yieldingly held to their work.

The operation of the invention may be explained as follows: When the shaft 5 rotates it imparts through the friction wheel 6 motion to the friction disks 7 so that they rotate in opposite directions and, as will be understood, at relative velocities depending upon the distance from the axis of the disks at which the wheel is operating. The pinions 8' are rotated coincidently with said friction disks and when they are in mesh with either of the gear wheels 27 or 27' the shaft 23 is accordingly rotated in one direction or the other, that is to say, assuming that when the pinions are engaging the wheel 27, as illustrated in Fig. 1, the shaft 23 is driven to impart a forward motion to a vehicle, for example, when the opposite or reverse motion would be obtained through the disengagement of the wheel 27 and the bringing of the other wheel, 27', into couple with the pinions. These changes in the direction of the rotary motions of the driven shaft would desirably be effected while the friction disks are retracted from the driving wheel so that the motion of the pinion will be discontinued, or nearly so, to permit the toothed elements being coupled without danger of mutilation. The retraction of the disks above referred to is accomplished by properly operating the levers 16 as already described.

The invention is quite simple in its construction, is efficient in operation and is readily controlled to produce changes of speed and also transmit motion in two rotary directions.

Among the advantages presented by our invention may be noted first, its adaptability to service on automobiles to do the range of work above alluded to, and also to the manner in which the component parts are assembled, and permitting the driven shaft not only to be moved in an axial direction but also of accommodating itself to various inclinations with regard to the power shaft. The functions just referred to eliminate the necessity of using universal joints in the power transmitting connections; also, by the use of the frictional driving mechanism, the changes in speed can be made so as to gradually accelerate or retard the same; the elimination of the use of clutches, which would be essential were positively driven members alone employed, and a further advantage is had by the slip-joint connection between the driven shaft and the bushing which carries the gears thereby allowing variations in length.

What we claim as our invention, is—

1. In combination with the power shaft, a driving wheel on said shaft, two disks adapted to be frictionally driven by said wheel, a pair of toothed pinions rotated by the respective disks, an axle carrying said disks and pinions and furnishing a support for a driven shaft, a pair of toothed gears carried by the driven shaft and arranged to be severally engaged with both the said pinions, and means for effecting such engagements.

2. In combination with the power shaft, a driving wheel mounted upon said shaft so as to be movable longitudinally thereof, means for effecting such adjustments, a pair of disks arranged to be frictionally driven by the wheel and normally in engagement therewith, means for simultaneously disengaging the disks from the wheel, a driven shaft, mechanical driving connections between said disks and the driven shaft, such connections being adapted to transmit the non-reversible rotary motions of the disks into two reversible rotary motions to the driven shaft, and means for effecting such reversal of motions of the driven shaft.

3. In apparatus of the class described, the combination with a pair of disks intended for rotation in opposite direction, a driving wheel for accomplishing such rotations through frictional contact with the respective disks, an axle arranged transversely of the axis of said driving wheel and axially of the disks, toothed pinions mounted upon the axle and rotated in opposite directions and coincidently with the respective disks, a driven shaft extending through said axle, two toothed gear wheels upon the driven shaft and respectively positioned upon opposite sides of the axle, and means whereby either of said gear wheels may be simultaneously meshed with both of said pinions or disengaged therefrom.

4. In apparatus of the class described, the combination with a wheel, and a pair of disks adapted to be frictionally driven thereby, rollers acting against said disks, levers carrying the rollers, link connections between the disks and the respective levers, and means for controlling the action of said levers whereby said rollers are engaged with or disengaged from the disks and the latter coincidently moved toward or from said wheel.

5. In apparatus of the class described, the combination with a wheel, and a pair of disks adapted to be frictionally driven thereby, of springs for yieldingly retaining the disks in engagement with the wheel, levers, link connections between the disks and the respective levers, and means for controlling the action of said levers whereby the disks are moved toward or from said wheel.

6. In apparatus of the class described, the combination with a wheel, and a pair of disks adapted to be frictionally driven thereby, of springs for yieldingly retaining the disks in engagement with the wheel, rollers acting against said disks, levers carrying the rollers, link connections between the disks and the respective levers, and means for controlling the action of said levers whereby said rollers are engaged with or disengaged from the disks and the latter coincidently moved toward or from said wheel.

7. The combination with the frictional disks, the driving wheel therefor, the axle carrying said disks, the bearings for said axle, levers fulcrumed on said bearings and means to prevent the spreading apart of said bearings, of springs for retaining the disks normally in yielding engagement with the driving wheel, supplementary means carried by the levers for retaining the disks in such engagement, and means for controlling the action of said levers.

8. In combination, a power shaft, a wheel rotatably carried by said shaft, means for adjusting the position of the wheel longitudinally of the shaft, an axle arranged transversely of the power shaft and adapted to be freely oscillated, two sleeves mounted upon the axle and capable of independent rotary motion, two disks rotatable with the respective sleeves and adapted to be moved longitudinally thereof, means comprising rollers carried by levers for exerting pressure against the disks in opposition to said wheel, a toothed pinion for each said sleeve, a driven shaft, a bushing carried upon this shaft and adapted for movement longitudinally thereof, said bushing extending through a housing provided in the axle, a pair of toothed gears fixedly secured to said bushing and disposed so as to be individually and interchangeably engaged with both of said pinions, and means to cause the longitudinal movement of the bushing for effecting the engagement of either of the toothed gears.

9. In combination, a power shaft, a wheel rotatably carried by said shaft, means for adjusting the position of the wheel longitudinally of the shaft, an axle arranged transversely of the power shaft and adapted to be freely oscillated, two sleeves mounted upon the axle and capable of independent rotary motion, two disks rotatable with the respective sleeves and adapted to be moved longitudinally thereof, means comprising rollers carried by levers for exerting pressure against the disks in opposition to said wheel, a toothed pinion for each said sleeve, a driven shaft, a bushing carried upon this shaft and adapted for movement longitudinally thereof, said bushing extending through a housing provided in the axle, anti-friction journal-bearings for the bushing and located within said housing, a pair of toothed gears fixedly secured to said bushing and disposed so as to be individually and interchangeably engaged with both of said pinions, and means to cause the longitudinal movement of the bushing for effecting the engagement of either of the toothed gears.

10. In combination, a power shaft, a wheel rotatably carried by said shaft, means for adjusting the position of the wheel longitudinally of the shaft, an axle arranged transversely of the power shaft and adapted to be freely oscillated, two sleeves mounted upon the axle and capable of independent rotary motion, two disks rotatable with the respective sleeves and adapted to be moved longitudinally thereof, a spring for each of said disks and tending to press the same into frictional engagement with said wheel, means for withdrawing the disks from such engagement, supplementary means comprising rollers carried by levers for exerting pressure against the disks in opposition to said wheel, a toothed pinion for each said sleeve, a driven shaft, a bushing carried upon this shaft and adapted for movement longitudinally thereof, said bushing extending through a housing provided in the axle, a pair of toothed gears fixedly secured to said bushing and disposed so as to be individually and interchangeably engaged with both of said pinions, and means to cause the longitudinal movement of the bushing for effecting the engagement of either of the toothed gears.

11. In combination, a power shaft, a wheel rotatably carried by said shaft, means for adjusting the position of the wheel longitudinally of the shaft, an axle arranged transversely of the power shaft and adapted to be freely oscillated, two sleeves mounted upon the axle and capable of independent rotary motion, two disks rotatable with the respective sleeves and adapted to be moved longitudinally thereof, a spring for each of said disks and tending to press the same into frictional engagement with said wheel, means for withdrawing the disks from such engagement, supplementary means comprising rollers carried by levers for exerting pressure against the disks in opposition to said wheel, a toothed pinion for each said sleeve, a driven shaft, a bushing carried upon this shaft and adapted for movement longitudinally thereof, said bushing extending through a housing provided in the axle, anti-friction journal-bearings for the bushing and located within said housing, a pair of toothed gears fixedly secured to said bushing and disposed so as to be individually and interchangeably engaged with both of said pinions, and means to cause the longitudinal movement of the bushing for effecting the engagement of either of the toothed gears.

In testimony whereof we affix our signatures in presence of two witnesses.

FREDERICK R. BURCH.
CHARLES E. S. BURCH.

Witnesses:
  PIERRE BARNES,
  HORACE BARNES.